Jan. 23, 1940. P. A. LA DELFA 2,187,976
COMBINED RADIATOR PROTECTOR AND EMERGENCY TANK
Filed May 12, 1938
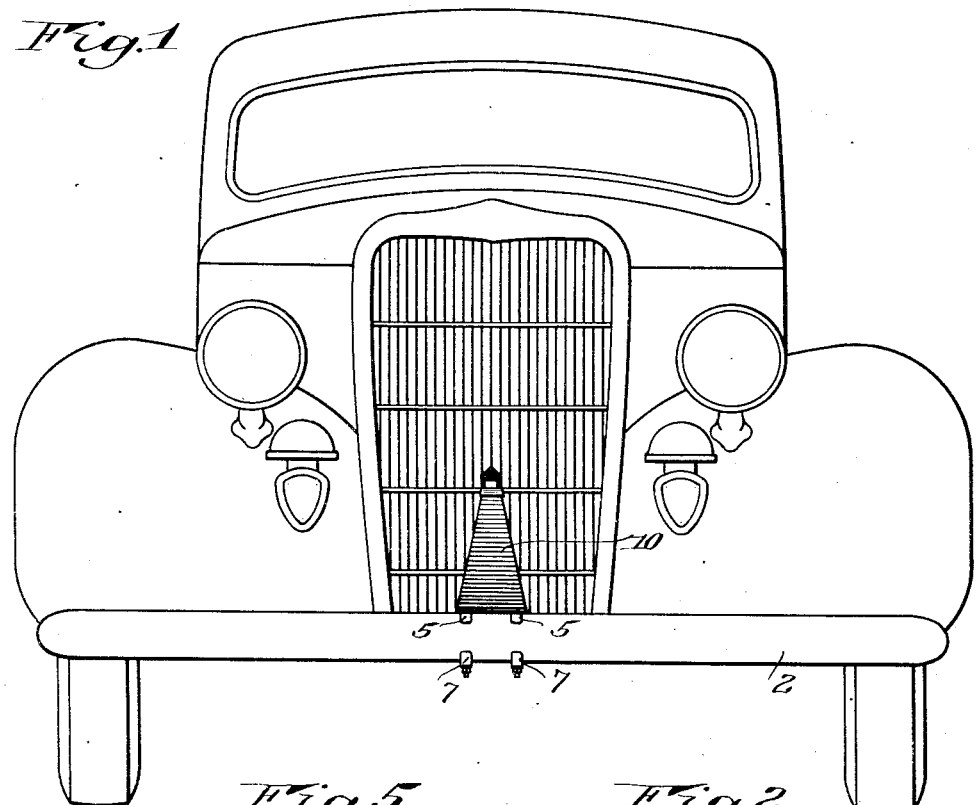
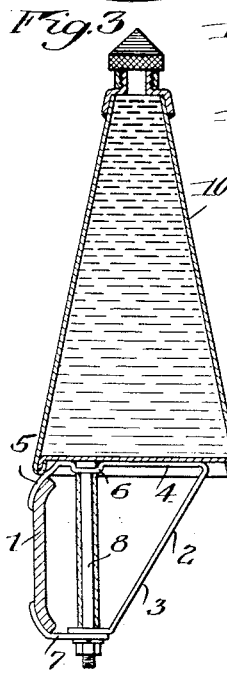
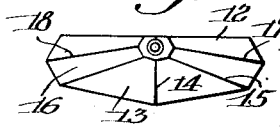
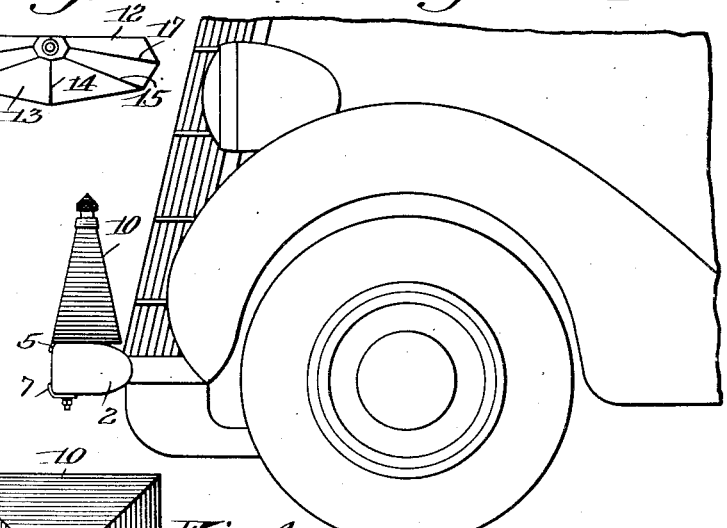
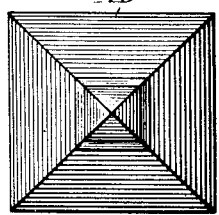
INVENTOR.
Philip A. La Delfa
BY Frank Kiefer
his ATTORNEY.

Patented Jan. 23, 1940

2,187,976

UNITED STATES PATENT OFFICE 2,187,976

COMBINED RADIATOR PROTECTOR AND EMERGENCY TANK

Philip A. La Delfa, Perry, N. Y.

Application May 12, 1938, Serial No. 207,565

3 Claims. (Cl. 293—55)

Automobiles are provided with radiators and with screens or other devices for protecting the radiators from damage. An additional protecting device is also frequently provided, which is mounted on the front bumper of the car and extends upwardly therefrom. I have invented a protecting device that is not only mounted on the front bumper and extends upwardly therefrom, but can also be used as a receptacle for the purpose of holding an emergency supply of gasoline or oil.

This and other objects of the invention will be illustrated in the drawing, described in the specification, and pointed out in the claims at the end thereof.

In the drawing:

Figure 1 is a front elevation of an automobile.

Figure 2 is a side elevation of the automobile shown in Figure 1, partly broken away at the top.

Figure 3 is an enlarged sectional view of the bumper and protecting device mounted thereon shown in Figures 1 and 2.

Figure 4 is a top plan view of the protecting device shown in Figures 1, 2 and 3.

Figure 5 is a top plan view of a modified form of this protecting device viewed from above.

In the drawing like reference numerals indicate like parts.

In the drawing reference numeral 1 indicates the bumper, 2 indicates a bracket comprising the inclined brace 3, a horizontal supporting rail 4, and down-turned flange 5 at the front. This bracket is provided with a socket 6 for receiving the head of the bolt. A supplemental bracket 7 is provided at the bottom, which engages the lower edge of the bumper. The bracket 2 is perforated at the top and the bottom to receive the bolt 8, which bolt also passes through a perforation in the small bracket 7, which bracket overlaps the lower end of the bracket 2 and is seated thereon when the nut is tightened up on the bolt. In this way the bracket is made to engage both the top and the bottom of the bumper. The small bracket 7 is made separate, so that it can be removed and put in place to complete the engagement with the bumper. In this way the bracket can be readily attached to the bumper.

Two of these brackets are provided, as shown in Figure 1, and these brackets are spot welded to the bottom of the receptacle 10, by which the brackets are spaced apart. By these brackets the receptacle is supported above the bumper. The receptacle is capable of holding a gallon, more or less, of any fluid, and is used more especially for the storage of an emergency supply of either oil or gasoline, and it is placed in front of the radiator, or the screen in front of the radiator, so as to provide additional protection therefor.

It will be understood that the bumper is placed frequently rather close to the radiator, and even too close to permit of a receptacle in the square pyramidal form shown in Figures 1 to 4 inclusive. In such case, the receptacle would preferably be formed with a base having great width laterally along the bumper and shallow in depth from front to back. Such a receptacle is shown in Figure 5, where the back of the receptacle is formed with a plane surface and the other three sides are bent somewhat from a ridge that is formed in a medial line; that is to say, the receptacle is formed of a plane back plate 12, and a front plate 13 bent in a medial line 14, and side plates 15 and 16 bent on medial lines 17 and 18. In this way the capacity and strength of the receptacle is preserved and the ornamental appearance of it is improved.

For the purpose of removing the gasoline from the receptacle the nut can be removed from the bolt 8, after which the bracket 7 can be removed, and then the rest of the device can be lifted bodily from the bumper, the cap can be removed from the top and then the gasoline can be poured directly into the tank, or the receptacle can be left in place and the gasoline can be removed from the receptacle by siphoning it out with a rubber tube, or in any other suitable manner.

For the purpose of making the bolt engage more positively with the two brackets I can provide a sleeve surrounding the bolt, which sleeve engages the top and bottom of the bracket 2 from the inside, with this sleeve in place when the nut is tightened up the ends of the two brackets where they overlap each other will be very firmly clamped together.

I claim:

1. In a device for protecting the radiator of an auto, the combination of an upper bracket adapted to engage over the bumper and extend rearwardly and then downwardly therefrom, a lower bracket adapted to engage under the bumper and extend rearwardly therefrom into engagement with the downwardly turned part of the upper bracket, a bolt longer than the width of the bumper having its head nested in the rearwardly extending part of the upper bracket and extending downwardly therefrom, the lower end of said bolt passing through both of said brackets and holding said brackets together, a protecting device attached to the top of the first named bracket and extending upwardly therefrom in front of the radiator.

2. In a device for protecting the radiator of an auto, the combination of an upper bracket adapted to engage over the bumper, a lower bracket adapted to engage under the bumper, means for joining the two brackets together to engage with the top and bottom of the bumper, said means including a bolt that is longer than the width of the bumper and a sleeve surrounding said bolt and placed between the brackets, the upper bracket extending rearwardly from the bumper and then downwardly and engaging around the bolt near the bottom thereof and below the sleeve and above the lower bracket, said bolt engaging with the upper bracket at the top of the bolt, a receptacle supported on top of said bracket in front of the radiator and being adapted to protect the radiator.

3. In a device for protecting the radiator of an auto, the combination of an upper bracket adapted to engage over the front of the bumper, a lower bracket adapted to engage under the front of the bumper, means for joining the two brackets together to engage with the top and bottom of the bumper, said means including a bolt that is longer than the width of the bumper and a sleeve surrounding said bolt and placed between the brackets, the upper bracket extending straight rearwardly from the bumper and at right angles thereto and then downwardly and rearwardly diagonally and engaging around the bolt near the bottom thereof and below the sleeve and above the lower bracket, said bolt engaging with the upper bracket at the top of the bolt, a receptacle supported on top of said bracket in front of the radiator and being adapted to protect the radiator.

PHILIP A. LA DELFA.